May 30, 1939.   P. S. HARPER ET AL   2,160,358
VALVE MECHANISM
Filed Jan. 11, 1937

Inventors:
Philip S. Harper,
George F. Turner,

Patented May 30, 1939

2,160,358

UNITED STATES PATENT OFFICE 2,160,358

VALVE MECHANISM

Philip S. Harper and George F. Turner, Chicago, Ill., assignors, by direct and mesne assignments, of one-fourth to said Philip S. Harper and one-half to Carolyn L. Harper, both of Chicago, Ill., and one-fourth to Philip S. Harper and Carolyn L. Harper, as trustees Application January 11, 1937, Serial No. 119,982

2 Claims. (Cl. 251—163)

This invention relates to a new and improved valve mechanism, and more particularly to an improved detent and plug locating and seating mechanism for valves.

The invention is especially adapted for use with valves such as used in gas stoves or the like, and particularly in connection with multiple valves for use with burners having a plurality of sections, although it may be used with other valves. With valves of the character described it is desirable to have one or more definite intermediate valve positions in addition to the usual open and closed positions. Such intermediate valve positions may define predetermined flows through the valve or may correspond to registration of different valve ports with different valve housing passages or discharge passages for multiple burner control.

It is an object of the present invention to provide a new and improved valve mechanism.

It is a further object to provide a new and improved valve locating detent and particularly such a detent which gives an audible indication of detent position.

It is also an object to provide a detent for use with a plug valve in which the detent mechanism coacts to maintain the plug in its bearing or seat.

It is an additional object to provide a detent in which the coacting parts are designed to minimize wear and reduce friction.

It is a further object to provide a device which is simple in design and construction and is adapted for commercial production.

Other and further objects will appear as the description proceeds.

We have shown a preferred embodiment of our invention in the accompanying drawing, in which—

Figure 1:
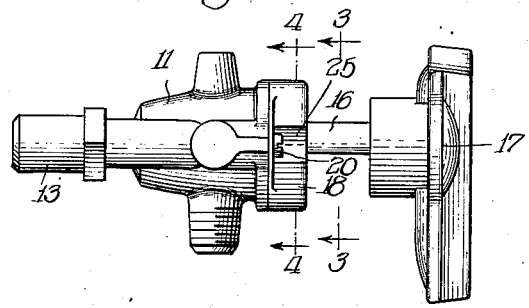
Figure 1 is an elevation of the valve construction.
Figure 2:
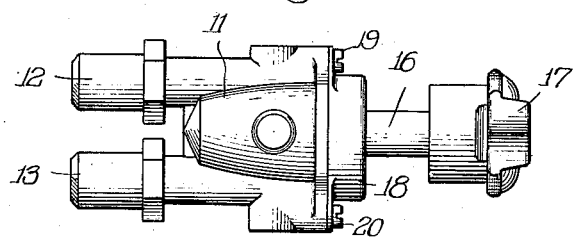
Figure 2 is a plan view of the construction shown in Figure 1.

The valve mechanism comprises a housing 11 having a pair of discharge nozzles 12 and 13 which may serve to direct the flow of combustible gas to any desired type of burner. As shown in Figure 5, the housing 11 is provided with a conical valve seat 14 in which is fitted a valve plug 15 which is rotatable in the valve seat. The valve stem 16 is connected to the valve plug 15 and, as clearly shown in Figures 3 and 4, this valve stem is non-circular in cross-section. In the form shown the valve stem is a cylindrical rod having one lateral portion removed. The valve stem is provided with an operating handle 17, as shown in Figures 1 and 2.

The closure member 18 is secured to the valve housing 11 by means of the screws 19 and 20. This closure 18 is provided with a circular opening 21 so that the valve stem 16 may freely rotate. The detent member 22 is loosely fitted on the valve stem 16. It has a non-circular opening through which the valve stem passes, but which opening is slightly larger than the valve stem so as to permit a small amount of relative movement between the stem and detent.

Figure 3:
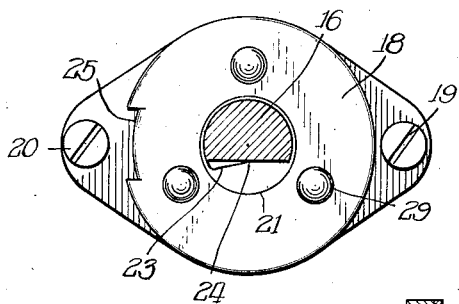
Figure 3 is a transverse section taken on line 3—3 of Figure 1.
Figure 4:
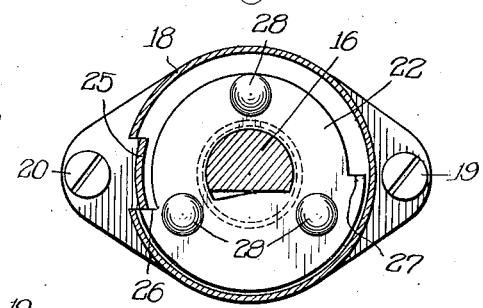
Figure 4 is a transverse section taken on line 4—4 of Figure 1.
Figure 5:
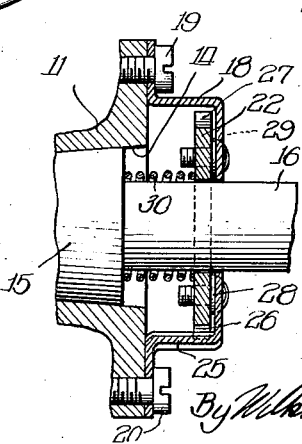
Figure 5 is a fragmentary, longitudinal section showing the detent construction.

As best shown in Figures 3 and 4, the opening 23 in the detent member is provided with a somewhat pointed surface 24 which engages the flattened side of the valve stem 16 to permit a rocking of the detent member on the valve stem through a limited arc. The closure 18 has a stop portion 25 which is pressed inwardly to be engaged by shoulders 26 and 27 on the detent member 22. The detent member 22 is provided with a plurality of raised portions 28 which, in the form of construction shown, consist in drive screws threaded into the detent member. These drive screws are preferably provided with smooth hardened heads which are adapted to engage in corresponding perforations 29 formed in the closure member 18. In the form of construction shown, there are three raised portions 28 and three openings 29 which are uniformly spaced about the axis of the valve stem 16.

The spring 30 is coiled about the valve stem 16 between the end of the plug 15 and the under surface of the detent member 22. This spring is under compression and serves the double function of maintaining the valve plug in its seat and of urging the detent member 22 yieldingly against the under side of the closure member 18.

The details of the construction and design of the valve passages and ports form no part of the present invention and have not been illustrated.

It will be apparent from the relationship of the shoulders 26 and 27 and the stop member 25 as clearly shown in Figure 4 that the detent member 22 may be rotated somewhat less than 180 degrees, but that the valve stem 16 and valve plug 15 may therefore be rotated through substantially a full 180 degrees because of the arcuate play between the parts. With the perforations 29 and raised portions 28 located as shown in the drawing, the raised portions fit into the perforations at one limit of rotation of the valve stem and at a position spaced 120 degrees from this limit of rotation. The valve stem and detent member may be then rotated through a further arc of 60 degrees at the end of which the shoulder 27 engages the stop 25 but the raised portions 28 are not fitted into the perforations 29. It will be understood that the number and arcuate spacing of the raised portions 28 and their corresponding perforations may be varied according to the design and desired operation of the valve plug and passages.

One use of a detent of this character would consist in the valve passages all being closed, with the parts in the position in which they are shown in Figures 3 and 4 and with the raised portions seated in the perforations. A rotation of the valve in the counterclockwise direction, as seen in Figures 3 and 4, through an arc of approximately 120 degrees may serve to open the flow of gas through the valve to one of the two discharge nozzles 12 or 13. The raised portions 28 will be seated in the perforations 29 at this position and will serve both to inform the operator that the position has been reached and to maintain the parts at adjusted position. A further rotation of the valve through the remaining possible arc of movement will bring the shoulder 27 against the stop 25 and in this position it may be arranged that the gas flows to both of the nozzles 12 and 13.

The rounded character of the raised portions 28 serves to yieldingly hold them in the perforations 29 and a moderate rotational thrust will serve to unseat the raised portions 28 from the perforations, the plate 22 pressing back against the spring 30, and the valve can be rotated as desired. The loose connection between the detent 22 and the valve stem 16 has an important function in that it permits the raised portions to snap into the perforations with an audible click so as to clearly advise the user that the position has been reached. Due to the rotational thrust permitted by the opening 23, shaped as shown in Figures 3 and 4, the rounded surfaces of the raised portions 28 and the pressure of the spring 30 causes the detent member 22 to snap a slight rotational arc when the rounded portions begin to pass opposite the perforations 29. The raised portions 28 are preferably evenly spaced around the axis of the valve stem 16 so as to give a uniform bearing for the detent member against the closure member and to prevent any eccentric twisting movement of the detent plate which might cause it to bind against the valve stem 16.

It will be understood that our valve detent construction may be used with a variety of forms of valves and serves to maintain the valve plug in any desired predetermined positions. While we have shown certain preferred embodiments of our invention it is to be understood that these are illustrative only, as the construction is subject to change and variation to meet different conditions and requirements, and we contemplate such modifications as come within the spirit and scope of the appended claims.

We claim:

1. In a valve construction, a valve housing, a valve plug rotatable therein, a closure secured to the housing and having an opening therein, a valve stem connected to the valve plug and extending from the housing through the opening in the closure, a detent disc located between the valve housing and closure and rotatable by the valve stem, the detent disc having a limited rotary play relative to the valve stem, a spring urging the plug against its seat and the detent disc toward the inner face of the closure, the closure and detent disc being provided with at least three substantially evenly spaced relieved portions adjacent the valve stem on one member and coacting rounded raised portions on the other member adapted to engage in the relieved portions of the other member under pressure of the spring.

2. In a valve construction, a valve housing, a valve plug rotatable therein, a closure secured to the housing and having an opening therein, a valve stem connected to the valve plug and extending from the housing through the opening in the closure, a detent disc located between the valve housing and closure and rotatable by the valve stem, a spring urging the plug against its seat and the detent disc toward the inner face of the closure, the closure and detent disc being provided with at least three substantially evenly spaced relieved portions adjacent the valve stem on one member and coacting rounded raised portions on the other member adapted to engage in the relieved portions of the other member under pressure of the spring, and stop means formed on the closure with coacting stop shoulders on the detent disc to form a fixed stop for the valve.

PHILIP S. HARPER.
GEORGE F. TURNER.

CERTIFICATE OF CORRECTION.

Patent No. 2,160,358.  May 30, 1939.

PHILIP S. HARPER, ET AL.

It is hereby certified that the above numbered patent was erroneously issued to the inventors, said "Philip S. Harper" and "George F. Turner", assignors, by direct and mesne assignments, of one-fourth to said Philip S. Harper and one-half to Carolyn L. Harper, and one-fourth to Philip S. Harper and Carolyn L. Harper, as Trustees, whereas said patent should have been issued to the inventors, Philip S. Harper and George F. Turner, of Chicago, Illinois, assignors, by direct and mesne assignments, of one-fourth to Philip S. Harper and one-fourth to Carolyn L. Harper, both of Chicago, Illinois, one-fourth to Carolyn L. Harper and Philip S. Harper, as Trustees, and one-fourth to Philip S. Harper and Carolyn L. Harper, as Trustees, as shown by the record of assignments in this office; page 2, first column, line 50, after the word "snap" insert ahead; and that the said Letters Patent should be read with this correction therein that the same may conform to the record of the case in the Patent Office.

Signed and sealed this 22nd day of August, A. D. 1939.

(Seal)

Leslie Frazer
Acting Commissioner of Patents.